(12) United States Patent
Mardapittas

(10) Patent No.: US 9,948,107 B2
(45) Date of Patent: Apr. 17, 2018

(54) ELECTRICAL DEVICE

(71) Applicant: EMSc (UK) Limited, Ecclesfield, Sheffield (GB)

(72) Inventor: Alex Mardapittas, Sheffield (GB)

(73) Assignee: EMSc (UK) Limited, Ecclesfield, Sheffield (GB)

( * ) Notice: Subject to any disclaimer, the term of this patent is extended or adjusted under 35 U.S.C. 154(b) by 222 days.

(21) Appl. No.: 14/850,996

(22) Filed: Sep. 11, 2015

(65) Prior Publication Data

US 2016/0079759 A1    Mar. 17, 2016

(30) Foreign Application Priority Data

Sep. 11, 2014  (GB) .................................. 1416092.3

(51) Int. Cl.
*H02J 3/00*   (2006.01)
*H02J 17/00*  (2006.01)
*H02M 7/04*   (2006.01)
*H02M 7/44*   (2006.01)
*H02J 3/38*   (2006.01)

(52) U.S. Cl.
CPC .............. *H02J 3/383* (2013.01); *H02J 3/005* (2013.01); *H02J 3/386* (2013.01); *H02J 17/00* (2013.01); *H02M 7/04* (2013.01); *H02M 7/44* (2013.01)

(58) Field of Classification Search
CPC .. H02J 3/005; H02J 3/383; H02J 3/386; H02J 17/00; H02M 7/04; H02M 7/44; G05F 1/14; H02P 13/00; H02P 13/06

USPC .......................................................... 307/26
See application file for complete search history.

(56) References Cited

U.S. PATENT DOCUMENTS 6,498,464 B1 * 12/2002 Doht ........................ H02J 3/04
                                                    323/247

FOREIGN PATENT DOCUMENTS

WO    WO 2011092527 A1 *  8/2011  ............. H05B 41/40
WO    WO 2013079962 A2 *  6/2013  ............. H02M 5/12

* cited by examiner

*Primary Examiner* — Hal Kaplan
(74) *Attorney, Agent, or Firm* — King & Schickli, PLLC

(57) ABSTRACT

A method of processing power in an electrical device, and an electrical device embodying this method, are both disclosed. A primary conducting element is connected with a secondary conducting element in a first parallel circuit. A current supply inlet and a primary load outlet are connected in series with the secondary conducting element, wherein the primary conducting element contains reverse current induced by the secondary conducting element in use. A secondary load outlet is connected with the primary conducting element in a second parallel circuit. A switching means is located in the first parallel circuit and switched between a first position for closing the primary conducting element to directly supply current from the current supply inlet to the secondary load outlet, and a second position opening the primary conducting element to direct reverse current from the primary conducting element to the secondary load outlet.

19 Claims, 6 Drawing Sheets

ELECTRICAL DEVICE

FIELD OF THE INVENTION

The present invention relates to a circuit configuration for an electrical device. More particularly, the present invention relates to a novel and improved configuration for a transformer, a voltage optimisation system or the like.

BACKGROUND OF THE INVENTION

Transformers are electrical devices in power networks that transfer electrical energy between circuits through electromagnetic induction. A typical transformer comprises at least two windings, a primary winding and a secondary winding, about a core. A current from a current supply, typically an alternative current from an electrical grid, is supplied into the transformer's primary winding, creates a magnetic flux in the core, and a magnetic field impinges on the secondary winding and induces a voltage therein.

Voltage optimisation devices are a type of transformer used to optimise the characteristics of the current supplied at the source according to current characteristics required at a load. Voltage optimisation devices accordingly also transform the first current into a second current, which meets the characteristics of the current required at the load. The first current is typically an alternating voltage, which may be either lower than the second alternating voltage, in which case the resultant voltage is increased and said to be stepped up, or higher than the second alternating voltage, in which case the resultant voltage is decreased and said to be stepped down. This transformation routinely results in excess transformed voltage.

In voltage optimisation systems of the prior art, the supply current flows into the first winding to the second winding of a voltage optimisation device, wherein the magnetic flux causes the induction of a reverse current, which is a fraction of the supply current. This reverse current has a negative charge and flows in the opposite direction to the supply current, wherein it is directed back into the current supply. This reverse current is also anti-phase to the supply current, and these characteristics contribute to the efficiency and optimising function of a voltage optimiser. This reverse current is a real form of energy, which is distinct from current traditionally referred to as 'apparent' or 'reactive'. This reverse current also constitutes excess transformed current.

Having regard to the increasing costs and difficulty of maintaining and improving infrastructures dedicated to the production of electricity and the powering of electrical grids, the widespread adoption of supply sources commonly referred to as renewable energy sources and typically constituted of wind- and solar-powered generators is occurring in parallel with a drive to minimize electrical consumption and maximize the use made of the supplied electricity. In that context, a solution is needed for harnessing the above mentioned excess transformed current for alternative uses.

SUMMARY OF THE INVENTION

The present invention provides both a novel method of processing power in an electrical device, and a device implementing the method, for harnessing the excess current produced in a transformer, with additional switching means at the primary winding for facilitating the extraction of this excess current towards a secondary load, for instance energy storage means.

According to an aspect of the present invention, there is therefore provided an electrical device, comprising a primary conducting element connected with a secondary conducting element in a first parallel circuit; and a current supply inlet and a primary load outlet connected in series with the secondary conducting element, wherein the primary conducting element contains reverse current induced by the secondary conducting element in use. The device is characterised in that it further comprises a secondary load outlet connected with the primary conducting element in a second circuit, wherein the first circuit and the second circuit are parallel to one another; and a switching means located in the first parallel circuit, having a first position for closing the primary conducting element to direct supply current from the current supply inlet to the secondary load outlet, and a second position opening the primary conducting element to direct reverse current from the primary conducting element to the secondary load outlet.

The inventive principle disclosed herein thus provides a solution for extracting the reverse current generated in an electrical circuit to a secondary load outlet at which it may be put to further use, non-limitative examples of which include storage for ulterior off-grid powering and/or powering of low-requirement electrical motors and the like, rather than allowing it to wastefully return into the supply.

In an embodiment of the device, the first and second conducting elements are windings about a core member.

In an embodiment of the device, the current from the current supply inlet is a first alternating current and the first parallel circuit is adapted to transform the first alternating current into a second alternating current which is higher or lower than the first alternating current.

In an embodiment of the device, the second parallel circuit further comprises a rectifier. In a variant of this embodiment, the secondary load outlet is connected to electrical power storage means.

Advantageously, embodiments including power storage means allow such storage means to be charged continuously so long as the device is in use and may usefully also allow such storage means to be selectively charged by the supply source directly.

In a further variant, the electrical power storage means may be coupled with a rectifier. In a further variant, the device may further comprise data processing means adapted to switch supply to the first parallel circuit between the current supply inlet and the electrical power storage means.

Advantageously, such embodiments reduce a user's reliance upon a constant supply from an electrical grid, by permitting automatic and/or selective disconnection of the device from the grid and using the current stored in the power storage means, for instance when supply from the grid is interrupted unexpectedly or according to a schedule. Further benefits derived from the above include a reduction of the overall supply required by a user through configurations of the device aimed at scheduled off-grid storage-powered operation, resulting in an improved stability of the electrical grid when the demand is reduced at peak times.

In an embodiment of the device, the device may further comprise a secondary current supply inlet connected in series with the secondary conducting element. In a variant of this embodiment, the secondary current supply inlet may be connected to at least one generator driven by wind, solar, heat or hydraulic power.

Advantageously, such embodiments extend the inventive principle to non-grid supply sources and further reduce a user's reliance upon a constant supply from an electrical grid, particularly when combined with other embodiments including power storage means.

Any of the above embodiments will preferably take the form of a transformer or a voltage optimiser.

According to another aspect of the present invention, there is also provided a method of processing power in an electrical device, comprising the steps of connecting a primary conducting element with a secondary conducting element in a first parallel circuit; and connecting a current supply inlet and a primary load outlet in series with the secondary conducting element, wherein the primary conducting element contains reverse current induced by the secondary conducting element in use. The method is characterised in that it comprises the further steps of connecting a secondary load outlet with the primary conducting element in a second parallel circuit, locating a switching means in the first parallel circuit, and switching the switching means between a first position for closing the primary conducting element to direct supply current from the current supply inlet to the secondary load outlet, and a second position opening the primary conducting element to direct reverse current from the primary conducting element to the secondary load outlet.

In an embodiment of the method, the first and second conducting elements are windings about a core member.

In an embodiment of the method, wherein the current from the current supply inlet may be a first alternating current, the method may comprise the further step of transforming the first alternating current into a second alternating current which is higher or lower than the first alternating current with the first parallel circuit.

In an embodiment of the method, wherein the second parallel circuit further comprises a rectifier, the method may comprise the further step of connecting the secondary load outlet to electrical power storage means. In a variant, the method may comprise the further step of coupling the electrical power storage means with a rectifier. In a further variant, the method may comprise the further step of switching supply to the first parallel circuit between the current supply inlet and the electrical power storage means with data processing means.

An embodiment of the method may comprise the further step of connecting a secondary current supply inlet in series with the secondary conducting element. In a variant, the method may comprise the further step of connecting the secondary current supply inlet to at least one generator driven by wind, solar, heat or hydraulic power.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
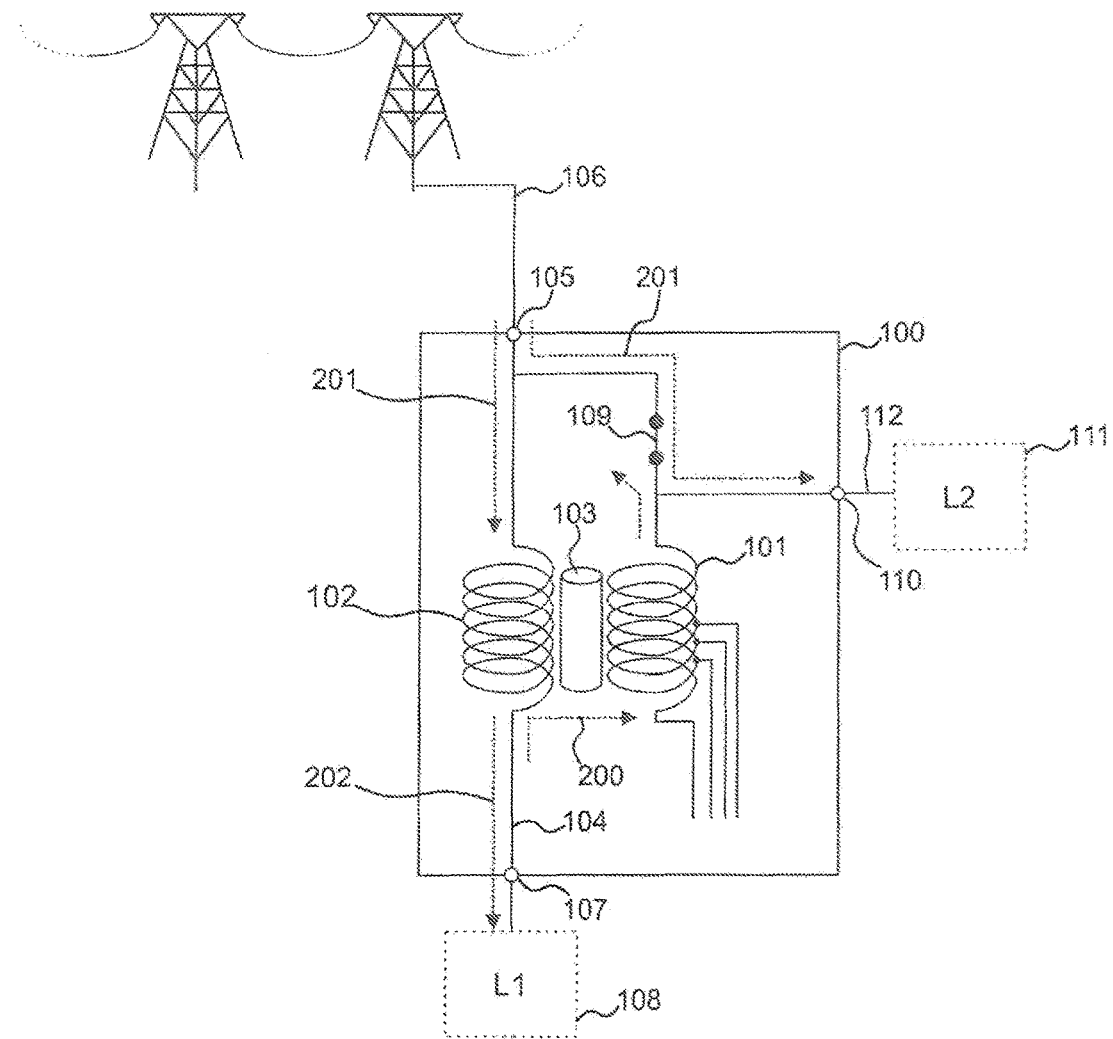
FIG. 1 is a functional diagram of a first embodiment of an electrical device according to the invention, having a primary conducting element connected with a secondary conducting element in a first parallel circuit, a current supply inlet and a primary load outlet connected in series with the secondary conducting element, a secondary load outlet connected with the primary conducting element in a second circuit, wherein the first and second circuit are parallel to one another, and a closed switching means located in the first parallel circuit.

With reference to FIG. 1, a first embodiment of an electrical device 100 according to the invention is shown, which has a primary winding 101 connected with a secondary winding 102 and wound about a core 103 in a first parallel circuit 104. The device 100 further includes a current supply inlet 105 to which current is delivered by a connection to an electrical grid 106. The supplied current is three phase alternating current, by way of non-limitative example representative of common characteristics for alternating current transmission. The device 100 further includes a primary load outlet 107 connected in series with the secondary winding 102, for connection to a load 108, for instance electrically-powered office or plant equipment rated for operation at 220V. The device 100 further includes a switching means 109 located in the first circuit 104 selectively opening and closing the primary winding 101 to a connection with a secondary load outlet 110 for connection to a secondary load 111 in a second circuit 112 which is parallel to the first circuit 104.

Figure 2:
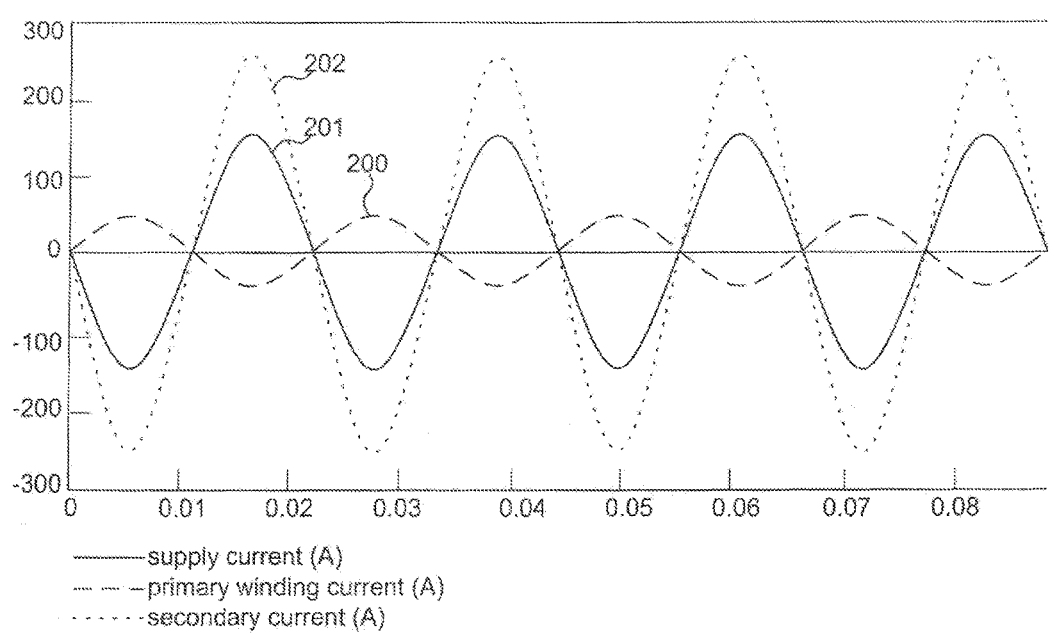
FIG. 2 shows current in the embodiment of FIG. 1 during use.

The primary winding 101 has real current 200 induced from the secondary winding 102. With reference to FIG. 2, this primary current 200 has opposite flow direction to the supply current 201, and it can be observed from FIG. 2 that the primary current 200 is anti-phase to the supply and secondary currents 201, 202.

The inventive principle resides in diverting current for alternate use, in particular extracting reverse current 200, wherein the extracted current 200 is the negatively charged reverse current from the second winding 102 of the device 100. If the reverse current is to be extracted from the load 108, it is done by the opening of the primary winding 101 in the circuit 104 through opening the switch 109. A parallel connection is then made to the secondary outlet 110 of the primary winding 101 such that the induced reverse current from the device 100 is directed to the secondary outlet 110 for alternate use, such as for a storage system 111 or to supply an alternative load 111. If the current is to be diverted from the supply 105 instead, the primary winding 101 remains closed through closing the switch 109.

In the example shown in FIG. 1, the device 100 is configured with the switch 109 closed, thus wherein the primary winding 101 is closed, whereby the parallel connection to the secondary outlet 110 is not made. The reverse current 200 is induced as normal, but, in this configuration, is not the extracted current. Because the primary winding 101 is closed, current from the supply source 107 flows directly to the additional outlet 110 instead.

Figure 3:
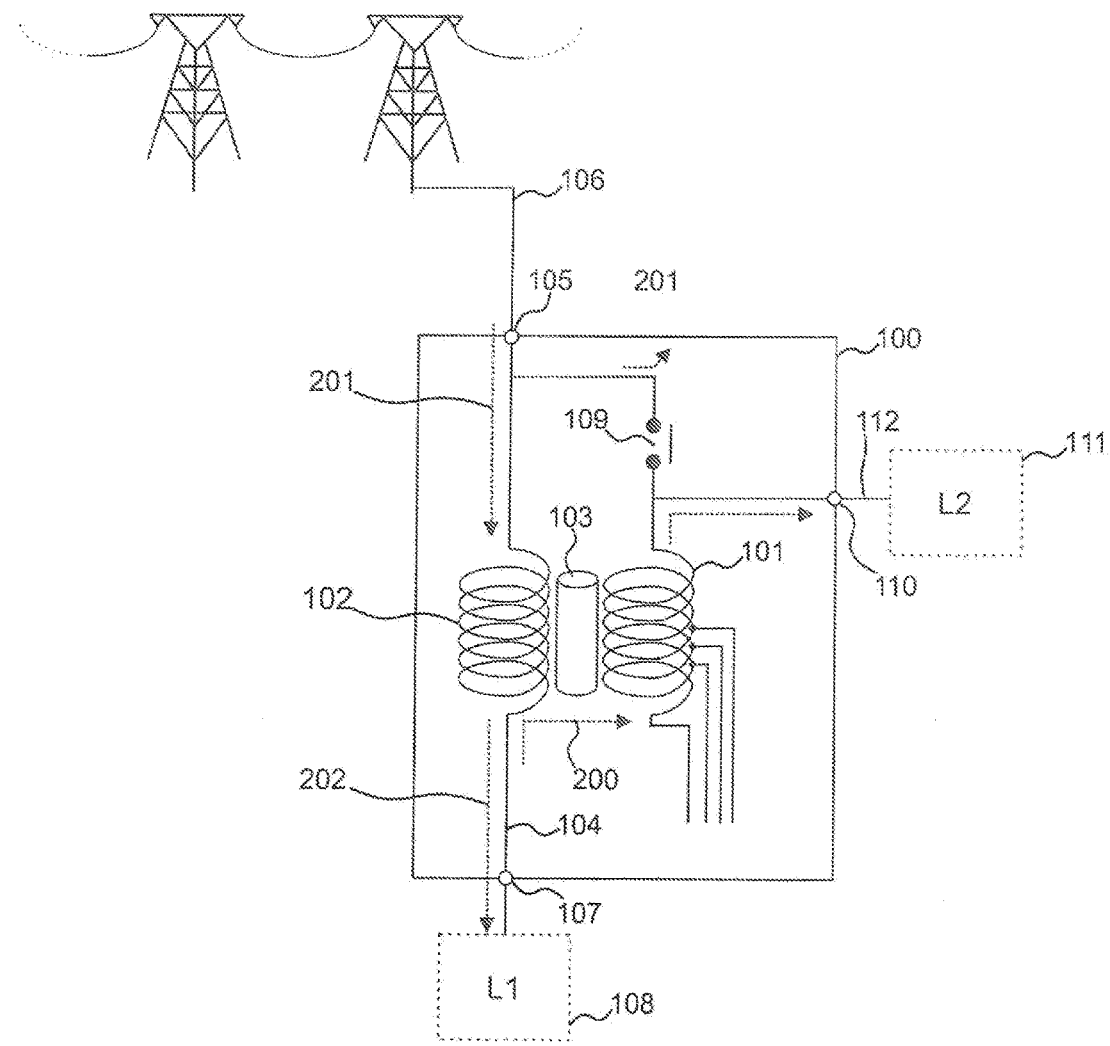
FIG. 3 shows the embodiment of FIG. 1 with the switching means in the first parallel circuit in the open position.

FIG. 3 shows the device 100 configured with the switch 109 open, thus wherein the primary winding 101 is open, whereby the parallel connection to the secondary outlet 110 is made. The reverse current 200 is again induced as normal and, in this configuration, is the current extracted to the secondary outlet 110. Because the primary winding 101 is open, current from the supply source 107 flows to the secondary winding 102 only.

Figure 4:
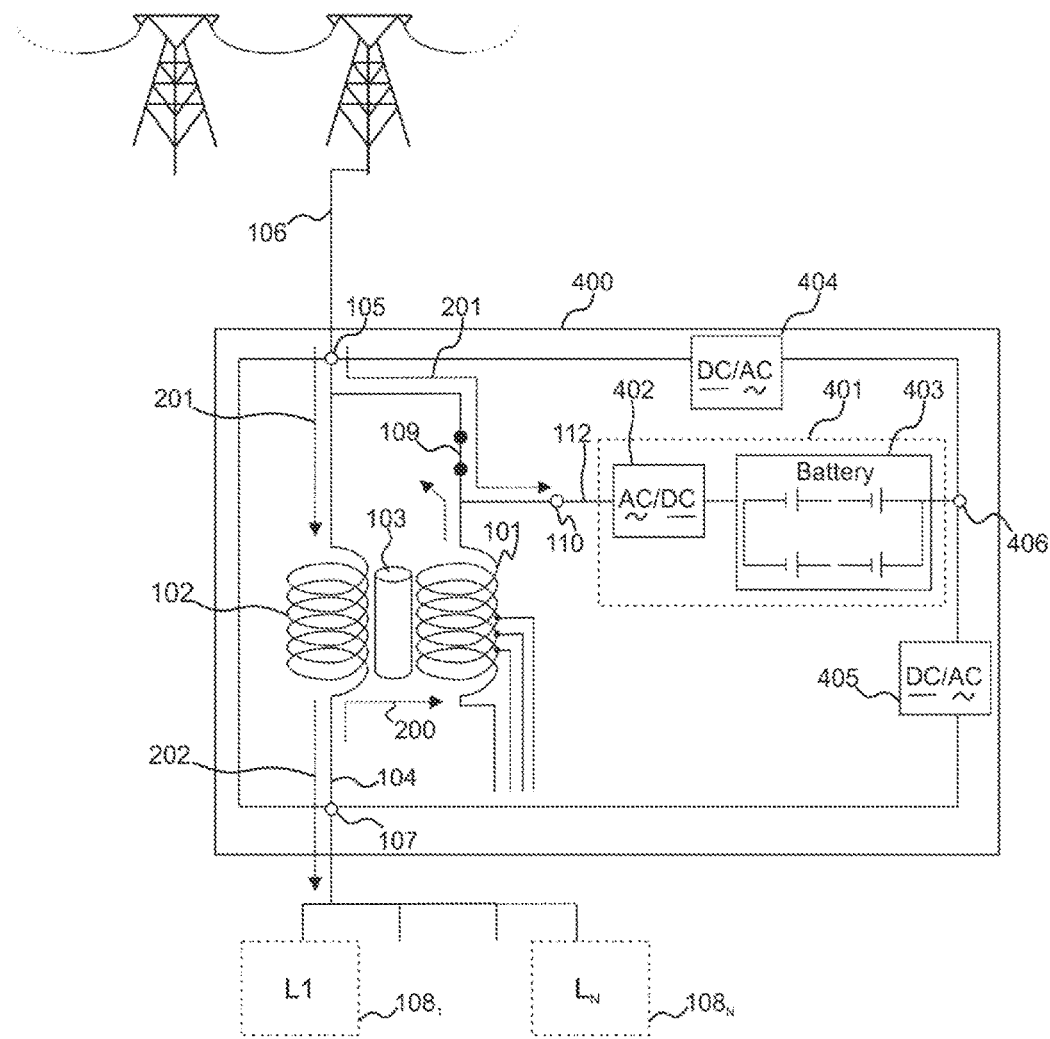
FIG. 4 is a simplified circuit diagram of a second embodiment of the invention as a voltage optimiser with the switching means of FIGS. 1 and 2 in the first position for closing the primary conducting element to direct supply current from the current supply inlet to the secondary load outlet.

With reference to FIG. 4 now, a second embodiment of an electrical device 100 is shown, as a voltage optimiser 400 also having an open primary winding 101 and a parallel connection. The voltage optimiser 400 performs the conventional functions of a voltage optimiser, but the induced reverse current 200 generated as part of such conventional functions is extracted into a power storage system 401 via a inverter 402.

The voltage optimisation system of FIG. 4 is thus again configured to receive a current from an electrical grid 106. The current at the supply inlet 105 is stepped down to the requirements of the load 108 and, in the embodiment as shown in FIG. 3, also charges a power storage system 401 as the switching means 109 of FIGS. 1 and 2 in the first position for closing the primary winding 101 to direct supply current from the current supply inlet 105 to the secondary load outlet 110, as first shown in FIG. 1.

Accordingly, the voltage optimiser 400 again has a primary winding 101 connected with a secondary winding 102 and wound about a core 103 in a first parallel circuit 104. The device 400 again includes a current supply inlet 105 to which current is delivered by a connection to an electrical grid 106. The device 400 again includes a primary load outlet 107 connected in series with the secondary winding 102, for connection to one or more primary loads $108_N$, for instance electrically-powered office or plant equipment rated for operation at 220V.

The device 400 again includes a switching means 109 located in the first parallel circuit 104 selectively opening and closing the primary winding 101 to a connection with a secondary load outlet 110 for connection to a power storage system 401 in a second parallel circuit 112.

The power storage system 401 comprises the AC/DC rectifier 402 connected in series with a battery 403 in the second parallel circuit 112. The voltage optimiser 400 further comprises first and second DC/AC inverters 404, 405, wherein the first inverter 404 is located between the current supply inlet 105 and the battery outlet 406 and the second inverter 405 is located between the primary load outlet 107 and the battery outlet 406.

Figure 5:
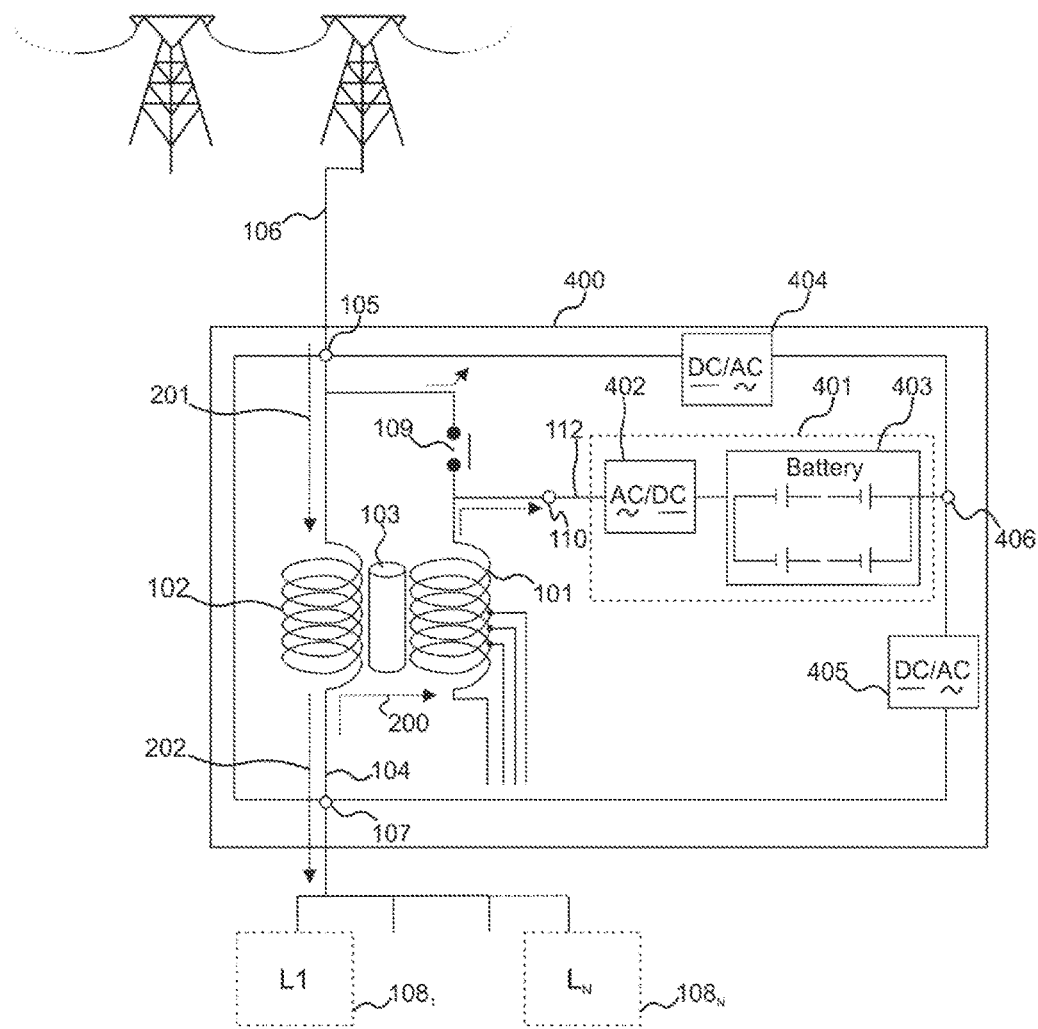
FIG. 5 is a simplified circuit diagram of the voltage optimiser of FIG. 4, with the switching means in the second position opening the primary conducting element to direct reverse current from the primary conducting element to the secondary load outlet.

With reference to FIG. 5, the voltage optimiser 400 is shown with the switching means 109 of FIGS. 1, 3 and 4 in the second position for opening the primary winding 101 to direct reverse current from the primary load outlet 107 to the power storage system 401, as first shown in FIG. 3.

It should be noted that the capacity to store from the load 108 arises both when the voltage optimisation device 400 is configured wherein the first alternating current supplied at the inlet 105 is higher than the secondary alternating current required at the load(s) 108, meaning the current is "stepped down", as well as when the first alternating voltage 105 is lower than the secondary alternating current, in which case the resultant current is thereby increased and said to be "stepped up".

If the connection of the primary winding 101 is again made via the switch 109, the configuration returns to that shown in FIG. 4 wherein the induced reverse current 200 is no longer diverted into storage 401. The storage device 401 is then again directly charged by the supply source 105. The timing for this configuration may advantageously correspond with a period of low power tariff, whereby the storage device 401 can be charged rapidly and cost-effectively.

Accordingly, it will be readily understood by the skilled reader that the above embodiments may be partially or fully automated with the adjunction of controlling hardware interfacing the various components of the device embodiments 100, 400 with the secondary load 111, 401 and controlling actuation of the switch 109 according to one or both of physical pre-determined parameters, such as supply power levels and/or the presence of reverse current from the load(s) 108, and administrative pre-determined parameters such as scheduled power costs and/or scheduled operation of office or plant equipment 108.

Figure 6:
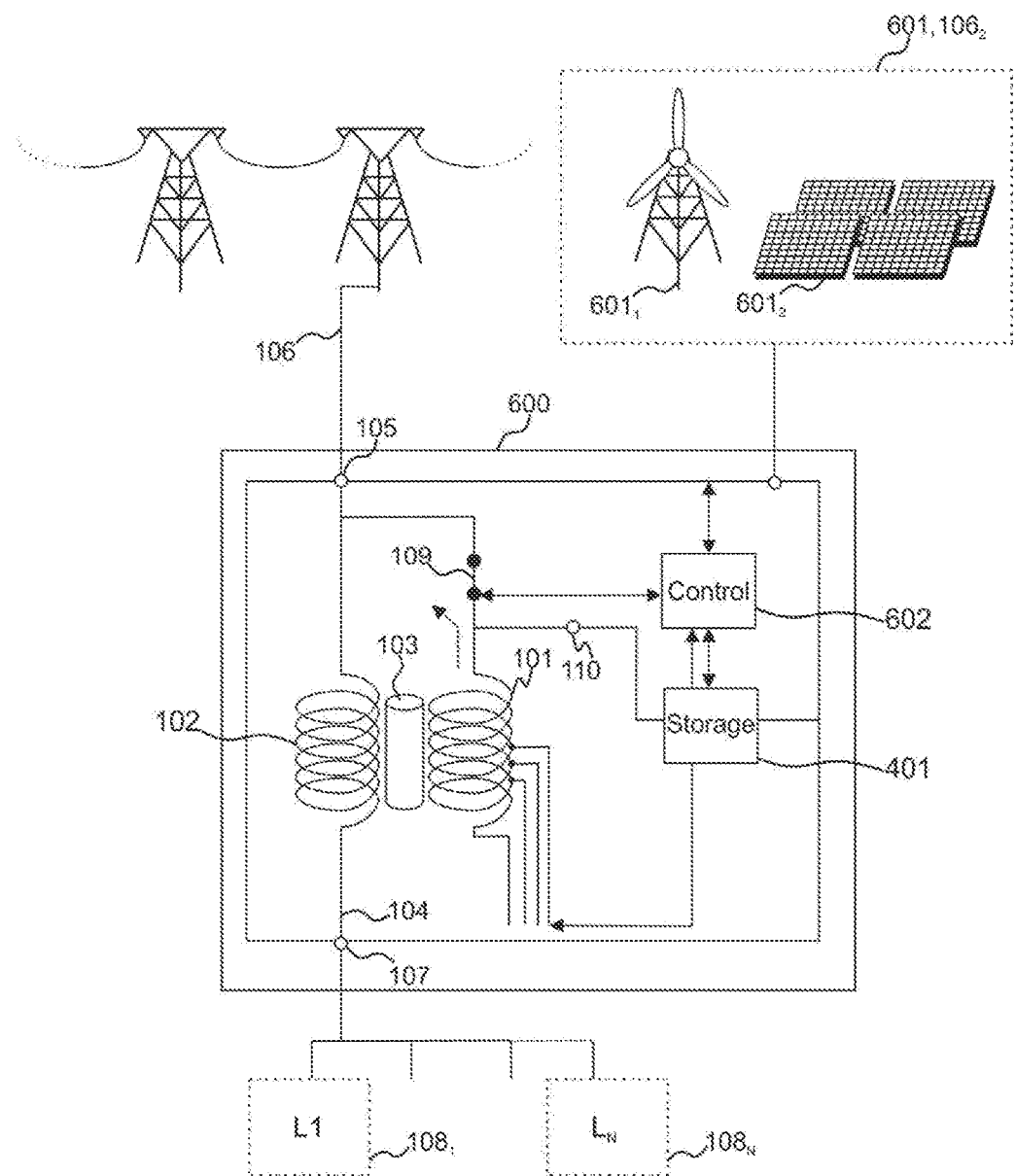
FIG. 6 is a functional diagram of a third embodiment of an electrical device according to the invention, having a secondary current supply and data processing means.

With reference to FIG. 6, a further embodiment of a device 600 is shown, based substantially on the power optimisation device 400 of FIGS. 4 and 5 and wherein like numbers refer to like features, wherein a renewable source of electricity generation 601 such as a solar PV system $601_2$ and/or a wind turbine $601_1$ is connected to the circuit 104 as an alternate supply source $106_2$.

The device 600 includes a master control unit 602 which is a data processing unit programmed to automatically control actuation of the switch 109, as well as the connection of the alternate supply source $106_2$ to the circuit, based on feedback signals which include Low Voltage (LV) side volts, demand and frequency; High Voltage (HV) side volts, demand and frequency; the output of the renewable source of electricity generation 601; the charge level and capacity of the power storage system 401; and control signals related to demand and frequency.

In this embodiment, when an additional source of electrical charge is needed for the storage device 401, for example if a greater amount of discharge is required according to a powering schedule, alternative power generated by the renewable source 601 can be fed to the storage system 401 by a dual input. Otherwise, the alternative power generated by the renewable source 601 may be fed directly to the main utility of the system, for example a building. This switching of the alternative power generated by the renewable source 601 is controlled by the master control unit 602.

In this specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An electrical device, comprising a primary conducting element connected with a secondary conducting element in a first circuit;

a current supply inlet and a primary load outlet connected in series with the secondary conducting element, wherein the primary conducting element contains reverse current induced by the secondary conducting element;

a secondary load outlet connected with the primary conducting element in a second circuit, wherein the first circuit and the second circuit are parallel to one another; and a switching means located in the first parallel circuit, having a first position for closing the primary conducting element to directly supply current from the current supply inlet to the secondary load outlet, and a second position opening the primary conducting element to direct reverse current from the primary conducting element to the secondary load outlet.

2. An electrical device according to claim 1, wherein the first and second conducting elements are windings about a core member.

3. An electrical device according to claim 1, wherein the current from the current supply inlet is a first alternating current and the first parallel circuit is adapted to transform the first alternating current into a second alternating voltage current which is higher or lower than the first alternating current.

4. An electrical device according to claim 1, wherein the second parallel circuit further comprises a rectifier.

5. An electrical device according to claim 4, wherein the secondary load outlet is connected to electrical power storage means.

6. An electrical device according to claim 5, wherein the electrical power storage means is coupled with an inverter.

7. An electrical device according to claim 6, further comprising data processing means adapted to switch supply to the first parallel circuit between the current supply inlet and the electrical power storage means.

8. An electrical device according to claim 1, further comprising a secondary current supply inlet connected in series with the secondary conducting element.

9. An electrical device according to claim 8, wherein the secondary current supply inlet is connected to at least one generator driven by wind, solar, heat or hydraulic power.

10. An electrical device according to claim 1, wherein the electrical device is a transformer or a voltage optimizer.

11. A method of processing power in an electrical device, comprising the steps of:

connecting a primary conducting element with a secondary conducting element in a first circuit; connecting a current supply inlet and a primary load outlet in series with the secondary conducting element, wherein the primary conducting element contains reverse current induced by the secondary conducting element;

connecting a secondary load outlet with the primary conducting element in a second circuit, wherein the first circuit and the second circuit are parallel to one another; locating a switching means in the first parallel circuit; and switching the switching means between a first position for closing the primary conducting element to directly supply current from the current supply inlet to the secondary load outlet, and a second position opening the primary conducting element to direct reverse current from the primary conducting element to the secondary load outlet.

12. A method according to claim 11, wherein the first and second conducting elements are windings about a core member.

13. A method according to claim 11, wherein the current from the current supply inlet is a first alternating voltage current and the method further comprises the step of transforming the first alternating current into a second alternating current which is higher or lower than the first alternating current with the first parallel circuit.

14. A method according to claim 11, wherein the second parallel circuit further comprises a rectifier and the method comprises the further step of connecting the secondary load outlet to electrical power storage means.

15. A method according to claim 14, comprising the further step of coupling the electrical power storage means with an rectifier.

16. A method according to claim 15, comprising the further step of switching supply to the first parallel circuit between the current supply inlet and the electrical power storage means with data processing means.

17. A method according to claim 11, comprising the further step of connecting a secondary current supply inlet in series with the secondary conducting element.

18. A method according to claim 17, comprising the further step of connecting the secondary current supply inlet to at least one generator driven by wind, solar, heat or hydraulic power.

19. A method according to claim 11, embodied in a transformer or a voltage optimizer.

* * * * *